United States Patent [19]
Johnson

[11] 4,416,112
[45] Nov. 22, 1983

[54] FUEL INJECTOR FOR DUCTED ROCKET MOTOR

[75] Inventor: Gary W. Johnson, McGregor, Tex.

[73] Assignee: Hercules Incorporated, Wilmington, Del.

[21] Appl. No.: 334,505

[22] Filed: Dec. 28, 1981

[51] Int. Cl.³ .............................................. F02K 7/10
[52] U.S. Cl. ..................................................... 60/251
[58] Field of Search ................. 60/250, 251, 253, 254, 60/270.1, 917, 39.462

[56] References Cited

U.S. PATENT DOCUMENTS

| | | | |
|---|---|---|---|
| 3,325,998 | 6/1967 | Novotny | 60/251 |
| 3,635,030 | 1/1972 | Schubert et al. | 60/251 |
| 3,807,169 | 4/1974 | Bradford | 60/270.1 |
| 3,844,118 | 10/1974 | Wilkinson | 60/251 |
| 4,133,173 | 1/1979 | Schadow | 60/917 |

FOREIGN PATENT DOCUMENTS 2062180  5/1981  United Kingdom ............... 60/270.1

*Primary Examiner*—Louis J. Casaregola
*Attorney, Agent, or Firm*—Edmund C. Ross, Jr.

[57] ABSTRACT

A fuel injector for ducted rocket motors is provided that distributes compressible fluid fuel flowing from an upstream throttle device through discharge ports of a hollow tubular member without losing throttling capacity of the throttle device. The injector has an axial fuel flow passage with a cross-sectional area that decreases stepwise rearward of a radial discharge of the fluid fuel. The dimensions and position of the flow passages of the injector provide desired flow distribution while preserving the smoothness and regularity thereof.

14 Claims, 5 Drawing Figures

FUEL INJECTOR FOR DUCTED ROCKET MOTOR

The Government has rights in this invention pursuant to Contract No. F33615-80-C-2005 awarded by the Air Force.

BACKGROUND OF THE INVENTION

This invention relates to ducted rocket motors and distribution of compressible fluid fuel that issues from the gas generator of these motors. This invention, more specifically, relates to a fuel injector that distributes such fluid fuel flowing at widely varying rates among spaced discharge ports for use in a secondary combustor of the rocket motor. This invention, still more specifically, relates to such a fuel injector which has proportioned axial and radial fuel flow passages for delivering selected amounts of the variable rate fuel flow smoothly and regularly to the secondary combustor.

Fixed flow rate ducted rocket fuel injectors distribute among a plurality of spaced discharge ports compressible fluid fuel flowing at a constant rate between gas generator and secondary combustor sections of a ducted rocket motor. A fixed flow injector may be designed so that its discharge ports have a much smaller total effective area than the effective area of its upstream, axial flow passage. As a result, the flow splits among these discharge ports approximately in accordance with their respective relative areas.

Variable flow rate fuel injectors employ an upstream throttle device for control of flow rate through the fuel injector. The discharge ports of these variable flow injectors need to have a total effective flow area that equals or exceeds that of the throttle device throat at its maximum opening. Otherwise, there can be loss of throttling capacity at corresponding minimum flow rates.

In addition, if the internal flow of fuel in these variable rate fuel injectors is allowed to accelerate to supersonic, then loss of throttling capacity also can occur along with distorted fuel distribution as a result of local shock phenomena and sharply reduced port discharge coefficients.

In accordance with this invention a fuel injector is provided which permits smooth and regular discharge of a compressible fluid fuel flowing at widely varying rates between gas generator and secondary combustor sections of a ducted rocket motor without loss of throttling capacity of an upstream throttling device.

Further in accordance with this invention, the fuel injector has a design which allows fabrication using ordinary machining techniques.

SUMMARY OF THE INVENTION

This invention relates to a fuel injector for a ducted rocket motor through which fluid fuel from a gas generator passes and is distributed into a secondary combustor of the rocket. The injector comprises an elongated tubular member having an axial flow passage that extends axially through the tubular member between an entry orifice for axial entry of a variable rate flow of compressible fluid fuel into the tubular member and an exit orifice for axial exit of a portion of the fluid fuel from the tubular member; the axial fuel flow passage has a cross-sectional area that decreases at a first rearwardly sloping step located between an entry annular section of the tubular member that comprises the entry orifice and a center annular section of the tubular member adjacent and rearward the entry annular section and further decreases at a second rearwardly sloping step located between the center annular section and an exit annular section of the tubular member comprising the exit orifice; in addition, the axial fuel flow passage communicates with radial fuel flow passages that permit exit radially from the tubular member of another portion of the fluid fuel, the radial passages being grouped fore and aft along the tubular member, a forward group thereof having a pair of the radial flow passages spaced from one another about the entry annular section and extending through the wall thereof adjacent the first step and a rearward group thereof having a rearward pair of the radial flow passages spaced about the center annular section and extending through the wall thereof adjacent the second step.

In an alternative embodiment, the aforementioned second step and consequent decrease in cross-sectional area are absent. In variations of this alternative embodiment, the exit orifice may extend radially or axially of the injector.

DETAILED DESCRIPTION OF THE INVENTION

FIGS. 1-4 illustrate fuel injector 10 of this invention and its placement in a ducted rocket motor.

Figure 1:
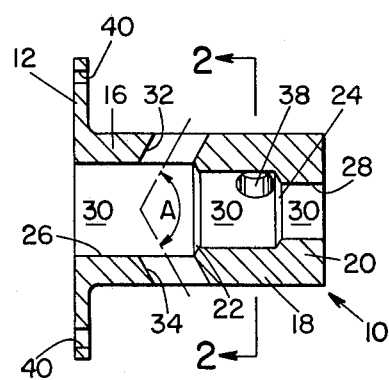
FIG. 1 is a cross-sectional view of fuel injector 10 of this invention which exposes its fuel flow passages.
Figure 2:
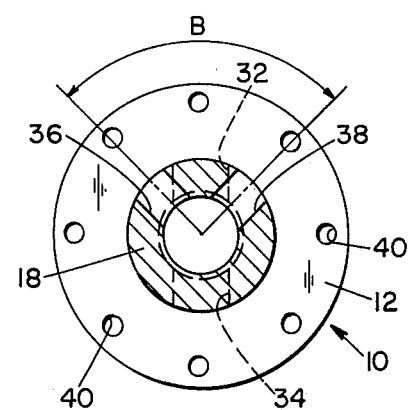
FIG. 2 is a view of fuel injector 10 looking in at 2—2 of FIG. 1 and in which flange 12 is shown in elevation.
Figure 3:
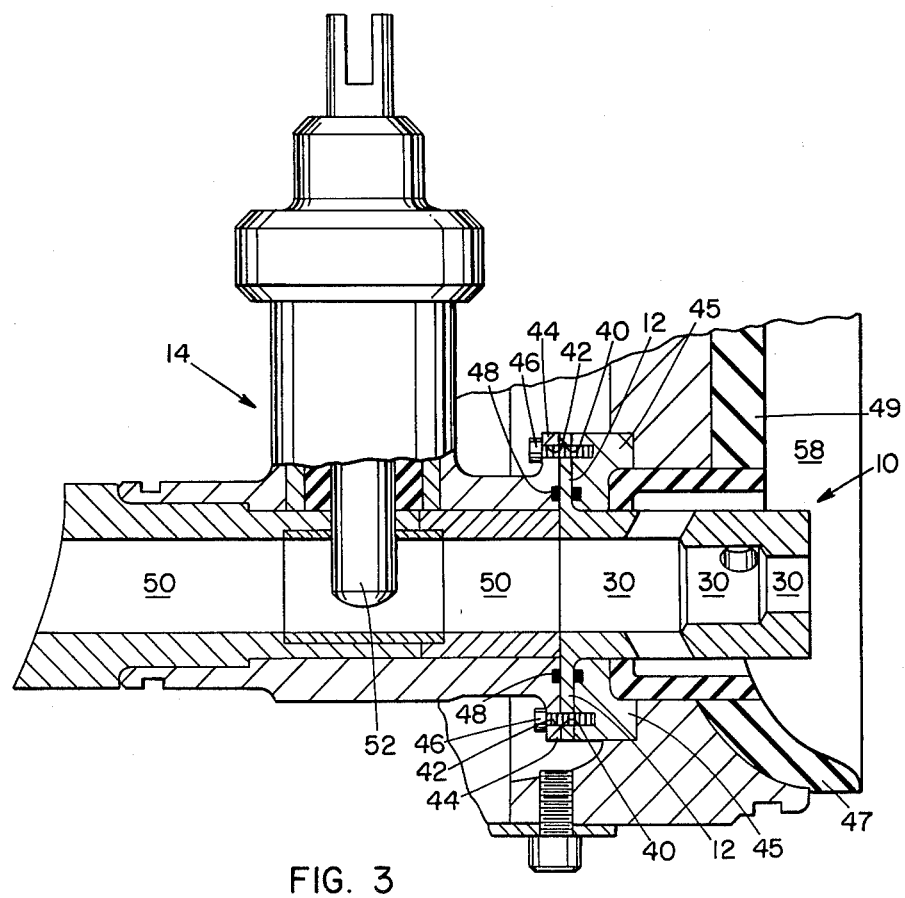
FIG. 3 is a view of fuel injector 10 (as in FIG. 1) mounted to plunger valve device 14.

Fuel injector 10 as seen in FIGS. 1-3 comprises flange 12 which serves for mounting injector 10 to valve control device 14. Plunger valve device 14 controls flow of compressible fluid fuel to fuel injector 10.

Flange 12 of fuel injector 10 and respective annular entry, center and exit sections 16, 18 and 20, integral therewith and with one another, form fuel injector 10. Rearwardly sloping step 22 separates respective entry and center annular sections 16 and 18; rearwardly sloping step 24 separates respective center and exit annular sections 18 and 20.

Entry annular section 16 comprises entry orifice 26; exit annular section 20 comprises exit orifice 28. Axial fuel flow passage 30 extends between entry orifice 26 and exit orifice 28.

About one-half of the compressible fluid fuel entering fuel injector 10 through orifice 26 leaves via exit orifice 28. The other half exits from fuel injector 10 through fore and aft pairs of discharge ports, 32 and 34, and, 36 and 38, respectively. The half and half distribution of fuel injector 10 is specific to a particular ducted rocket and a desired fuel distribution therefor. (Other distributions can be made using the principles of this invention. Fuel injectors capable of making these other distributions may have steps and ports different in number and dimension to match desired flow distribution and preserve its smoothness and regularity.)

Fore discharge ports 32 and 34 are spaced about exit entry annular section 18 about 180° from one another and extend through the inner wall entry annular section 18 forward of step 22. Fore discharge ports 32 and 34 angle from axial fuel flow passage 30 in a direction toward exit orifice 28. The center axial axes of fore discharge ports 32 and 34, respectively, intersect one another to form angle A of about 120° in a plane longitudinally bisecting axial fuel flow passage 30.

The diameter of fore discharge port 32 equals that of discharge port 34 and is greater than either of the diameters of aft discharge ports 36 and 38. The diameter of aft discharge port 36 equals that of aft discharge port 38.

Aft discharge ports 36 and 38 are spaced from one another about center annular section 18 and extend through the wall thereof forward of step 24. Aft discharge ports 36 and 38 have center axes that intersect one another and form angle B of about 90° in the plane of 2—2 of FIG. 2.

Flange 12, seen in elevation in FIG. 2, has a plurality holes 40 which serve in fastening fuel injector 10 to control device 14. As seen in FIG. 3, holes 40 register with their counterparts 42 in flange 44 of plunger valve device 14 for fastening fuel injector 10 to device 14 via bolt means 46. (Two of the eight holes in flange 44 are illustrated in FIG. 3.) Groove 48, circumferentially extending around the inner part of the periphery of flange 44, accepts an o-ring. Bolts means 46 also extend into flange 45 carried by dome 47 of secondary combustor section 58 to mount injector 10 and device 14 in the ducted rocket motor.

When fuel injector 10 and plunger valve device 14 fasten together as shown in FIG. 3, cylindrical fluid fuel passage 50 of device 14 and axial fuel flow passage 30 of fuel injector 10 register with one another. Movement of plunger 52 further in or out of cylindrical fluid fuel passage 50 meters fluid fuel into fuel injector 10 and, consequently, secondary combustor section 58 of the ducted rocket motor (see FIG. 4). Aft ports 36 and 38 issue fuel on either side of ignitor mount 49.

Plunger valve devices which may be used in conjunction with fuel injector 10 are disclosed more fully in U.S. Ser. No. 129,284 filed in the name of Burkes, Jr. and Miller on Mar. 11, 1981 and entitled "Nozzle/Valve Device For Ducted Rocket Motor".

Figure 4:
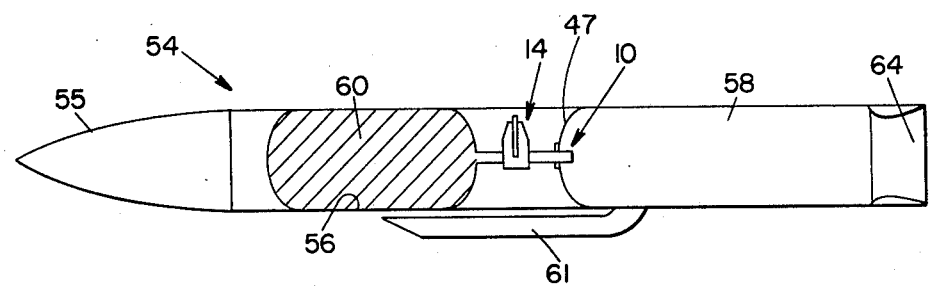
FIG. 4 is a schematic view of ducted rocket motor section 54 having gas generator 56 and combustor 58 which communicate with one another through plunger valve device 14 and fuel injector 10.

FIG. 4 schematically illustrates sectionally ducted rocket 54 with nose 55 (e.g. warhead and guidance section). Ducted rocket 54 has gas generator module 56 and secondary combustor 58 communicating through plunger valve device 14 and fuel injector 10. Gas generator module 56 has solid fuel grain 60 that burns to give a compressible fluid fuel which, in turn, burns in secondary combustor 58 with air entering from air inlet 61 thereof. The products of the combustion exhaust through nozzle 64 of secondary combustor or ramburner 58 to drive ducted rocket 54.

Manufacture of fuel injector 10 utilizes three different sized, successively larger, bits (not shown) to bore axial fuel flow passage 30. The larger drill bits have bevels at their ends to provide steps 22 and 24 of fuel injector 10.

The three drill bits are used in manufacturing fuel injector 10 as follows. The first, and smallest diameter bit bores through a suitably sized tubular member. This smallest bit has a diameter equal to that of exit orifice 28. The second, and next largest diameter, bit bores partially through the suitably sized tubular member. This second bit has a diameter corresponding to that of center annular section 18 of injector 10. The third, and largest diameter, bit then bores through still less of the suitably sized tubular member. This third bit has a diameter equal to that of entry annular section 16. Fore and aft discharge port pairs 32 and 34, and, 36 and 38, respectively, are then drilled with other bits to produce fuel injector 10.

The fuel flow injector of this invention distributes fuel flowing from a plunger valve device such as 14 at a rate between about 0.3 pounds per second and 1.3 pounds per second at temperatures between about 1000° F. and 2200° F.

It will be understood that the particular dimensions of axial fuel flow passage 30, steps 22 and 24, discharge ports 32, 34, 36 and 38 will be chosen to suit other temperatures and variable flow rates as well as packaging contraints. Also, it will be understood that more or less ports positioned somewhat differently than shown in FIGS. 1–3 will accomplish results in accordance with this invention. Still further, it will be understood that injector 10 and plunger valve device 14 can be positioned differently within the ducted rocket motor.

EXAMPLE

Fuel injector 10 was designed using the following analytical approach. The technique can be applied to establish other designs.

DEFINITIONS $A_c$ is the maximum flow area of a flow control device such as device 14 in FIG. 3.

$A_p$ is the sum of the flow areas of the discharge ports, of an injector, e.g., discharge ports 32, 34, 36, 38 and 28 of the injector 10 of FIGS. 1–3.

$A_1$ is a flow area of the injector before bleed.

$A_2$ is a flow area of the injector after bleed.

$A_B$ is the flow area of an axial flow passage such as passage 30 of injector 10, assumed to be the geometric area times an appropriately selected discharge coefficient.

$X$ is the distance a plunger or other such valve member such as plunger 52 retracts from a fixed point.

$X_c$ is the distance which the plunger retracts just before the control device unchokes.

$M_B$ is the Mach number of the bulk flow in the injector.

$\gamma$ is the specific heat ratio of the compressible fluid under examination.

$W_1$ is the flow amount before bleed.

$W_2$ is the flow amount after bleed.

$W_b$ is the amount bled, i.e. $W_1-W_2$.

$\Delta A_p$ is $A_B-A_P$ $C_D$ is a discharge coefficient.

$\Delta C_D$ is discharge coefficient change that unchokes the valve control device, assumed to be 0.1 times $C_D$.

Referring to the above definitions, $A_c \leq A_p$ at $X=X_c$ is assumed in order that the flow control device serve as a throttle when flow through it is at a minimum. In order that the flow through the axial flow passage remains subsonic, then $A_p < A_B$.

Isentropic flow is assumed and $$\frac{A_p}{A_B} = M_B \left[ \frac{\left(\frac{\gamma+1}{2}\right)}{\left(1 + \frac{\gamma-1}{2} M_B^2\right)} \right]^{\frac{\gamma+1}{2(\gamma-1)}} \quad \text{I}$$

by known analysis.

The mass distribution is taken as an independant variable in the injector geometric design. The mass distribution is fixed to values which satisfy the fuel distribution, mixing and combustion requirements in the ramburner (i.e. secondary combustor).

Figure 5:
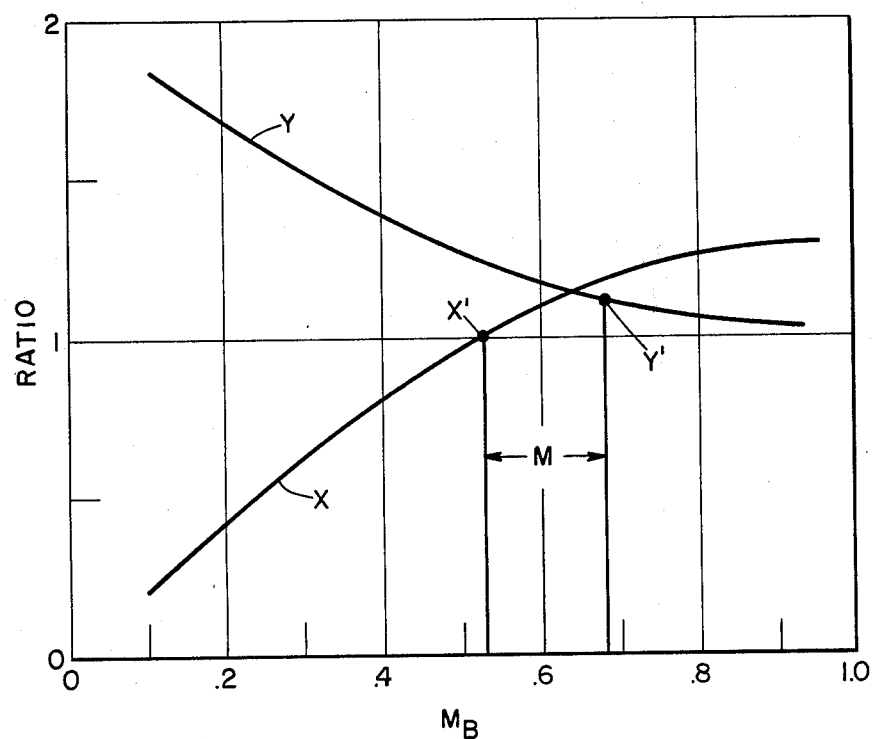
FIG. 5 is a graph that illustrates data for design of injector 10.

FIG. 5 shows a plot (Curve X) of $A_p/A_c$ versus $M_B$ per equation I made by computing $A_p/A_B$ using the appropriate $\gamma$, wherein $A_p/A_c$ is equal to $$\frac{A_p}{A_B} \times \frac{A_B}{A_c} \quad \text{II}$$

and $A_B/A_c$ is determined by known valve design data. The intersection $X^1$ of this $A_p/A_c$ function with the $A_p/A_c=1$ line in FIG. 5 provides the lower limit on design Mach number $M_B$.

A "pad" on the design $M_B$ Mach number is made to prevent local disturbances and transonic regions from growing too large, too fast or too strong. In this way uncertainties and variations in port $C_D$ can be allowed for without provoking a throttle unchoke. If the area change from subsonic to sonic flow is represented by $\Delta A_p$, the area ratio (and thus the Mach number) is limited by the $C_D$ uncertainty:

$$1 + \frac{\Delta C_D}{C_D} \leq 1 + \frac{\Delta A_p}{A_B} \quad \text{III}$$

where $A_B - A_p = \Delta A_p$. Equation III can be expressed in another form, as a function of the Mach Number $M_B$ using equation I to yield:

$$1 + \frac{C_p}{C_D} \leq 2 - \quad \text{IV}$$

$$\frac{A_p}{A_B} = 2 - M_B \left[ \frac{(\gamma+1)}{\left(1 + \frac{\gamma-1}{2} M_B^2\right)} \right]^{\frac{\gamma+1}{2(\gamma-1)}}$$

A plot of $2-(A_p/A_B)$ versus $M_B$ is shown as curve Y in the graph of FIG. 5.

The intersection $Y^1$ of curve Y with the $1+\Delta C_D/C_D=$ constant line represented by the left hand side of Equation IV provides the upper bound on the Mach number $M_B$, as shown in FIG. 5. The Mach numbers M between intersections $X^1$ and $Y^1$ thus are design limits; a value in the midrange is selected which in turn defines $A_p$.

The next step is to define the specific port area and step geometry necessary to hold the design Mach number constant. It is known that $$\frac{dM}{M} = \frac{-2\left(1 + \frac{\gamma-1}{2} M^2\right)}{(1 - M^2)} \frac{dA}{A} + \quad \text{V}$$

$$\frac{2(1 + \gamma M^2)\left(1 + \frac{\gamma-1}{2} M^2\right)}{(1 - M^2)} \frac{dw}{w}$$

For a constant - Mach design, V simplifies to:

$$\frac{dA}{A} = (1 + \gamma M^2) \frac{dw}{w} \quad \text{VI}$$

where dM is equal to zero and this equation VI integrates to $$\frac{A_2}{A_1} = \left(1 - \frac{W_b}{W_1}\right) 1 + \gamma M_B^2 \quad \text{VII}$$

Application of equation VII across each change in diameter of the axial flow passage and also from before step to subsonic discharge port entrance (treating post-step as a bleed), gives the specific port areas and step diameter. The sonic areas at each port location are subsonic entrance areas multiplied by $A_p/A_B$. (Equation I) The total of the individually calculated areas is checked against the design value computed from the design Mach number and the $A_c$ value. (Scaling can correct for any slight difference, if there is any.)

The resulting design data is used to compute drill-sizes and geometry by means of empirical discharge coefficient for the discharge ports. The axial angle of discharge ports such as 32 and 34 in FIGS. 1-3 compensates partially for the large shock train and short distance between the plunger and these ports when the plunger is nearly closed leading to large available area ratios behind the valve throat for potential supersonic expansion.

The analysis for fuel injector 10 yields the following:

| $C_D$ | Diameter (inches) | Identity of Flow Area |
|-------|-------------------|-----------------------|
| 1.0 | 0.700 | axial passage 30 through 16 |
| 0.9 | 0.601 | axial passage 30 through 18 |
| 0.9 | 0.416 | axial passage 30 through 20 |
| 0.6 | 0.344 | discharge port 32 |
| 0.6 | 0.344 | discharge port 34 |
| 0.7 | 0.296 | discharge port 36 |
| 0.7 | 0.296 | discharge port 38 | wherein the discharge coefficients ($C_D$) are assumed as shown, a bulk Mach number ($M_B$) of 0.60 is used and the mass flow selected splits evenly between the side and end discharge ports (i.e. 50% through port 28 and a total of 50% through ports 32, 34, 36 and 38.) Also, the flow is selected to split evenly between forward and rearward ports 32 and 34 and 36 and 38, respectively, to give 12½% of the flow through each individual port.

What is claimed is:

1. A fuel injector for a ducted rocket motor through which fluid fuel from a gas generator passes and is distributed into the secondary combustor of the motor, said fuel injector comprising:

an elongate tubular member having a fuel flow passage that extends axially through said tubular member between an entry orifice for entry of compressible fluid fuel into said tubular member and an exit orifice, rearward of said entry orifice, for exit of a portion of said fluid fuel from said tubular member;

said axial fuel flow passage having a cross-sectional area that decreases at a first rearwardly sloping step located between an entry annular section of said tubular member that comprises said entry orifice and a center annular section of said tubular member adjacent and rearward said entry annular section and further decreases at a second rearwardly sloping step located between said center annular section and an exit annular section comprising said exit orifice;

said axial fuel flow passage communicating with radial fuel flow passages that permit exit radially from said tubular member of another portion of said fluid fuel, said radial passages grouped fore and aft along said tubular member, a forward group thereof having a pair of said radial flow passages spaced from one another about said entry annular section and extending through the wall thereof adjacent said first step and a rearward group thereof having a rearward pair of said radial flow passages spaced about said center annular section and extending through the wall thereof adjacent said second step.

2. An injector in accordance with claim 1, wherein said forward pair of said radial flow passages extend obliquely through the wall of said entry annular section from said axial fuel flow passage toward said exit orifice.

3. A fuel injector in accordance with claim 1, wherein said rearward pair of said radial flow passages extend through the wall of said center annular section normal to said axial fuel flow passage.

4. A fuel injector in accordance with claim 3, wherein said rearward pair of said radial flow passages comprise center axial axes that inersect at a right angle along a center longitudinal axis of said fuel flow passage.

5. A fuel injector in accordance with claims 1, 2, 3 or 4 wherein a radial flow passage of said forward pair has a cross-sectional area that exceeds the cross-sectional area of a radial flow passage of said rearward pair.

6. A fuel injector in accordance with claim 5, wherein said exit orifice has a cross sectional area that exceeds the cross sectional area of each of said radial flow passages.

7. A fuel injector for a ducted rocket motor through which fluid fuel from a gas generator passes and is distributed into the secondary combustor of the motor, said fuel injector comprising:

an elongate tubular member having an axial fuel flow passage that extends axially through said tubular member between an entry orifice for axial entry of compressible fluid fuel into said tubular member and an exit orifice for axial exit of a portion of said fluid fuel from said tubular member;

said axial fuel flow passage having a cross-sectional area that decreases at a first rearwardly sloping step located between an entry annular section of said tubular member that comprises said entry orifice and a center annular section adjacent and rearward said annular section and further decreases at a second rearwardly sloping step located between said center annular section and an exit annular section of said tubular member adjacent and rearward said center annular section, said exit annular section comprising said exit orifice;

said axial fuel flow passage communicating with radial flow passages that permit exit radially from said tubular member of another portion of said fluid fuel, said radial passages grouped fore and aft along said tubular member, a forward group thereof having a pair of said passages spaced diametrically from one another about said entry annular section and extending obliquely through the wall thereof adjacent said first step from said axial fuel flow passage in a direction toward said exit orifice and a rearward group thereof having a pair of said passages spaced about said center annular section and extending through the wall thereof adjacent said second step normally to said axial fuel flow passage.

8. A fuel injector in accordance with claim 7, wherein said tubular member comprises a flange having means for mounting said tubular member to a flow control device.

9. A fuel injector in accordance with claim 8, wherein an intersection of the center axes of said rearward pair forms an angle of about 90°.

10. A fuel injector in accordance with claim 9, wherein said forward pair have a cross-sectional area exceeding that of said rearward pair.

11. A fuel injector in accordance with claim 10, wherein said entry annular section has a axial length that exceeds that of said center annular section.

12. A fuel injector for a ducted rocket motor through which fluid fuel from a gas generator passes and is distributed into the secondary combustor of the motor, said fuel injector comprising:

an elongate tubular member having an axial fuel flow passage that extends axially between an entry orifice for axial entry of compressible fluid fuel into said tubular member and an exit orifice for axial exit of a portion of said fluid fuel from said tubular member;

said axial fuel flow passage having a cross-sectional area that decreases at a rearwardly sloping step located between an entry annular section of said tubular member that comprises said entry orifice and a center annular section adjacent and aft said entry annular section;

said axial fuel flow passage communicating with radial fuel flow passages that permit radial exit from said tubular member of another portion of said fluid fuel, said radial passages grouped together fore and aft along said tubular member, a forward group of said radial flow passages spaced from one another about said entry annular section and extending through the wall thereof adjacent said rearwardly sloping step and a rearward group of said radial flow passages spaced about said center annular section and extending through the wall thereof forward of said exit orifice.

13. A fuel injector in accordance with claim 12, wherein the relative diameters of said radial flow passages, said entry and exit orifices and said axial fuel flow passage forward and rearward of said rearwardly sloping step are chosen so that the flow of said fuel smoothly and regularly travels through said injector over a range of fuel flows.

14. A fuel injector for a ducted rocket motor through which fluid fuel from a gas generator passes and is distributed into the secondary combustor of the motor, said fuel injector comprising:

an elongate tubular member having fuel flow passage that extends from an entry orifice, axially positioned in said tubular member, for axial entry of compressible fluid fuel into said tubular member to an exit orifice for exit of a portion of said fluid fuel from said tubular member;

a radial flow passage radially communicating with said fuel flow passage for exit of another portion of said fluid fuel from said tubular member, said radial flow passage being spaced along said tubular member between said entry and exit orifices;

said axial fuel flow passage having a cross-sectional area that decreases at a rearwardly sloping step located adjacent said radial flow passage between said radial flow passage and said exit orifice.

* * * * *

UNITED STATES PATENT AND TRADEMARK OFFICE
CERTIFICATE OF CORRECTION

PATENT NO. : 4,416,112
DATED : November 22, 1983
INVENTOR(S) : Gary W. Johnson

It is certified that error appears in the above-identified patent and that said Letters Patent are hereby corrected as shown below:

Col. 5, equation IV between lines 42 and 50,

"$1 + \frac{C_p}{C_D} \leq 2 -$" should read "$1 + \frac{\Delta C_D}{C_D} \leq 2 -$".

Signed and Sealed this

Twenty-fourth Day of January 1984

[SEAL]

Attest:

GERALD J. MOSSINGHOFF

Attesting Officer           Commissioner of Patents and Trademarks